United States Patent
Sandgren et al.

(10) Patent No.: US 11,044,667 B2
(45) Date of Patent: Jun. 22, 2021

(54) NETWORK NODE POWER CONTROL

(71) Applicant: Telefonaktiebolaget LM Ericsson (publ), Stockholm (SE)

(72) Inventors: Magnus Sandgren, Staffanstorp (SE); Michael Breschel, Lund (SE); Pål Frenger, Linköping (SE); Magnus Nilsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/643,950

(22) PCT Filed: Sep. 27, 2017

(86) PCT No.: PCT/EP2017/074492
§ 371 (c)(1),
(2) Date: Mar. 3, 2020

(87) PCT Pub. No.: WO2019/063072
PCT Pub. Date: Apr. 4, 2019

(65) Prior Publication Data
US 2020/0413331 A1   Dec. 31, 2020

(51) Int. Cl.
*H04W 4/02*   (2018.01)
*H04W 52/02*   (2009.01)

(52) U.S. Cl.
CPC .............. *H04W 52/0203* (2013.01)

(58) Field of Classification Search
CPC .................. H04W 52/02; H04W 4/02
See application file for complete search history.

(56) References Cited

U.S. PATENT DOCUMENTS

| 8,917,645 | B2  | 12/2014 | Kopikare et al. |
| 10,784,942 | B2 * | 9/2020 | Chang ............. H04B 7/0695 |

(Continued)

FOREIGN PATENT DOCUMENTS

| EP | 2157824 A1 | 2/2010 |
| WO | 2007035447 A2 | 3/2007 |
| WO | 2015026803 A1 | 2/2015 |

OTHER PUBLICATIONS

"D2.3 Architecture of Optical/Wireless Backhaul and Fronthaul and Evaluation", 5G-Xhaul; Dynamically Reconfigurable Optical-Wireless Backhaul/Fronthaul with Cognitive Control Plane for Small Cells and Cloud-RANs; 5GPP; European Commission; Horizon 2020; European Union funding for Research & Innovation, Dec. 31, 2016, pp. 1-41.

(Continued)

*Primary Examiner* — Michael T Vu
(74) *Attorney, Agent, or Firm* — Murphy, Bilak & Homiller, PLLC

(57) ABSTRACT

A method is disclosed for a centralized unit (CU) of a wireless communication network, wherein the CU is associated with each of one or more remote units (RU) of the wireless communication network via a respective communication interface. The CU is adapted to operate in one of a plurality of modes including at least a normal operation mode and a power saving operation mode, and the normal operation mode defines a plurality of functions to be performed by the CU. The method comprises (when the CU is in the normal operation mode) determining that a traffic load associated with the one or more RU fulfills a power saving operation criterion, configuring—via the respective communication interface—each of the RU for autonomous operation, whereby each of the RU is configured to execute at (Continued)

least one of the plurality of functions, and transferring from the normal operation mode to the power saving operation mode. Corresponding method for a remote unit, computer program products, network node, and arrangements for CU and RU, respectively, are also disclosed.

20 Claims, 4 Drawing Sheets

(56) References Cited

U.S. PATENT DOCUMENTS

| | | | | |
|---|---|---|---|---|
| 2004/0097268 | A1* | 5/2004 | Kurokawa | H04W 52/288 455/561 |
| 2010/0008277 | A1* | 1/2010 | Kopikare | H04W 52/0206 370/311 |

OTHER PUBLICATIONS

"Energy efficiency analysis of the reference systems, areas of improvements and target breakdown", INFSO-ICT-247733 Earth; Deliverable D2.3; Energy Aware Radio and NeTwork tecHnologies; Seventh Framework Programme, Dec. 31, 2010, pp. 1-68.

"How a Split can make the difference", 4G/5G RAN Architecture; Ericsson Technology Review, Jul. 2016, pp. 1-16.

"RAN Internal Architecture fora Flexible Function Distribution", 3GPP TSG-RAN WG3 #92; R3-161297; Nanjing, China, May 23-27, 2016, pp. 1-4.

"3GPP TS 38.401 V0.2.0"; 3rd Generation Partnership Project; Technical Specification Group Radio Access Network; NG-RAN; Architecture description (Release 15); Jul. 2017, pp. 1-20.

Imran, Muhammad Ali, et al., "Deliverable D6.4 Final Integrated Concept", Energy Aware Radio and network Technologies (EARTH) INFSO-ICT-247733 EARTH https://bscw.ictearth.eu/pub/bscw.cgi/d49431/EARTH_WP6_D6.4.pdf., Jun. 2012, pp. 1-95.

Shehadeh, Dareen, et al., "How to wake up an access point?", Wireless Days (WD), 2016, pp. 1-6.

* cited by examiner

NETWORK NODE POWER CONTROL

TECHNICAL FIELD

The present disclosure relates generally to the field of wireless communication networks. More particularly, it relates to power control in network nodes of wireless communication networks.

BACKGROUND

Within the Third Generation Partnership Program (3GPP) and other standardization organizations, there is focus on reducing energy consumption for network nodes (e.g. base stations). Some reasons for this focus include reduced cost and reduced environmental footprint, for example.

A typical approach to reduce power consumption is to define different power states (a.k.a. modes) for a device (or a module, unit, block, etc. comprised in a device), wherein the different power states include one or more low power states, such as sleep modes. Typically, power savings comes at a cost of increased latency for some or more of the functions to be performed by the device. Thus, a deep sleep mode typically entails a long wake up time compared to a less deep sleep mode.

According to many radio access technologies used for wireless communications, there is necessary signaling between devices even when there is no served traffic (typically control signaling between a wireless communication device such as a user equipment (UE) and a network node such as a base station, and/or broadcast signaling by a base station). Such signaling prevents efficient base station sleep modes and results in poor scaling of power consumption versus served traffic.

There exist approaches to power control for network nodes. For example, EP 2157824 A1 discloses a network node adapted to enter a standby mode, wherein a sleep control device of the network node is adapted to switch on the network node on appearing of a trigger event during a monitoring period. However, this approach—at least partly—suffers from the same problem as indicated above since the network node must leave the standby mode for some of the necessary signaling, e.g. broadcast signaling.

Therefore, there is a need for alternative and improved approaches to the use of low power modes for network nodes.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It should be noted that, when energy consumption (or energy savings) are referred to herein, the corresponding statements is generally equally applicable to power consumption (or power savings), and vice versa.

It is an object of some embodiments to solve or mitigate, alleviate, or eliminate at least some of the above or other disadvantages.

According to a first aspect, this is achieved by a method for a centralized unit (CU) of a wireless communication network, wherein the CU is associated with each of one or more remote units (RU) of the wireless communication network via a respective communication interface. The CU is adapted to operate in one of a plurality of modes including at least a normal operation mode and a power saving operation mode, and the normal operation mode defines a plurality of functions to be performed by the CU.

The method comprises (when the CU is in the normal operation mode) determining that a traffic load associated with the one or more RU fulfills a power saving operation criterion, configuring—via the respective communication interface—each of the RU for autonomous operation, whereby each of the RU is configured to execute at least one of the plurality of functions, and transferring from the normal operation mode to the power saving operation mode.

In some embodiments, at least one of the plurality of functions comprises one or more of:
 responding to a random access request by issuing of a random access grant for transmission;
 responding to demands for system information by providing a system information block for transmission;
 providing synchronization signals for transmission;
 providing master information blocks for transmission; and
 providing system information blocks for transmission.

In some embodiments, the power saving operation criterion comprises none of the one or more RU being associated with a WCD in a connected mode.

In some embodiments, configuring each of the RU for autonomous operation comprises at least one of:
 providing the RU with pre-generated random access grants;
 providing the RU with pre-generated system information blocks;
 providing the RU with a timing reference; and
 providing the RU with pre-generated master information blocks.

The power saving operation mode is a sleep mode according to some embodiments. Then, in some embodiments, the method may further comprise (when the CU is in the power saving operation mode) detecting a normal operation mode triggering event, configuring—via the respective communication interface—each of the RU for non-autonomous operation, and transferring from the power saving operation mode to the normal operation mode.

In some embodiments, detecting the normal operation mode triggering event comprises at least one of:
 receiving an interrupt signal from one of the one or more RU;
 receiving a paging signal from the wireless communication network; and
 detecting that a predetermined duration for the power saving operation mode has elapsed.

The power saving operation mode is a power off mode according to some embodiments. Then, if the CU is a first CU according to some embodiments, the method may further comprise configuring a second CU to control the respective communication interfaces of the one or more RU, detect a normal operation mode triggering event for the first CU, configure—via the respective communication interface—each of the RU for non-autonomous operation, and cause the first CU to transfer from the power off mode to the normal operation mode.

A second aspect is a method for a remote unit (RU) of a wireless communication network, wherein the RU is associated with a centralized unit (CU) of the wireless communication network via a communication interface. The RU is adapted to operate in one of a plurality of modes including at least a non-autonomous operation mode associated with a normal operation mode of the CU and an autonomous operation mode associated with a power saving operation mode of the CU, and the normal operation mode defines a plurality of functions to be performed by the CU.

The method comprises (when the RU is in the non-autonomous operation mode) receiving—via the communication interface—autonomous operation mode configuration signaling from the CU, configuring the RU to execute at least one of the plurality of functions, and transferring from the non-autonomous operation mode to the autonomous operation mode.

In some embodiments, the at least one of the plurality of functions comprises one or more of:
responding to a random access request by issuing of a random access grant for transmission;
responding to demands for system information by providing a system information block for transmission;
providing synchronization signals for transmission;
providing master information blocks for transmission; and
providing system information blocks for transmission.

In some embodiments, the configuration signaling comprises at least one of:
pre-generated random access grants;
pre-generated system information blocks;
a timing reference; and
pre-generated master information blocks.

The method may, according to some embodiments, further comprise (when the RU is in the autonomous operation mode) detecting a non-autonomous operation mode triggering event, and transferring from the autonomous operation mode to the non-autonomous operation mode, whereby the RU is not configured (162) to execute any of the plurality of functions.

In some embodiments, detecting the non-autonomous operation mode triggering event comprises at least one of:
receiving a random access request from a wireless communication device associated with the RU;
detecting that more pre-generated random access grants are required;
detecting that more pre-generated system information blocks are required;
detecting that more pre-generated master information blocks are required; and
detecting that a new timing reference is needed.

The method may further comprise transmitting an interrupt signal to the CU for triggering normal operation mode of the CU.

In some embodiments, detecting the non-autonomous operation mode triggering event comprises at least one of:
receiving a paging signal from the CU;
receiving, via the communication interface, non-autonomous operation mode configuration signaling from the CU; and
detecting that a predetermined duration for the autonomous operation mode has elapsed.

A third aspect is a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

A fourth aspect is an arrangement for a centralized unit (CU) of a wireless communication network, wherein the CU is associated with each of one or more remote units (RU) of the wireless communication network via a respective communication interface. The CU is adapted to operate in one of a plurality of modes including at least a normal operation mode and a power saving operation mode, and the normal operation mode defines a plurality of functions to be performed by the CU.

The arrangement comprises a controller configured to cause (when the CU is in the normal operation mode) determination of that a traffic load associated with the one or more RU fulfills a power saving operation criterion, configuration—via the respective communication interface—of each of the RU for autonomous operation, whereby each of the RU is configured to execute at least one of the plurality of functions, and transfer from the normal operation mode to the power saving operation mode.

A fifth aspect is an arrangement for a remote unit (RU) of a wireless communication network, wherein the RU is associated with a centralized unit (CU) of the wireless communication network via a communication interface. The RU is adapted to operate in one of a plurality of modes including at least a non-autonomous operation mode associated with a normal operation mode of the CU and an autonomous operation mode associated with a power saving operation mode of the CU, and the normal operation mode defines a plurality of functions to be performed by the CU.

The arrangement comprising a controller configured to cause (when the RU is in the non-autonomous operation mode) reception—via the communication interface—of autonomous operation mode configuration signaling from the CU, configuration of the RU to execute at least one of the plurality of functions, and transfer from the non-autonomous operation mode to the autonomous operation mode.

A sixth aspect is a centralized unit (CU) comprising the arrangement of the fourth aspect.

A seventh aspect is a remote unit (RU) comprising the arrangement of the fifth aspect.

An eighth aspect is a network node comprising at least one of: a centralized unit according to the sixth aspect and one or more remote units according to the seventh aspect.

In some embodiments, any of the above aspects may additionally have features identical with or corresponding to any of the various features as explained above for any of the other aspects.

An advantage of some embodiments is that an approach to low power modes of a network node is provided.

Another advantage of some embodiments is that power consumption at low traffic load scenarios may be decreased.

Another advantage of some embodiments is that dynamic use of one or more low power modes of a network node is enabled.

Yet an advantage of some embodiments is that necessary signaling is administered even if the network node is in a low power mode.

Another advantage of some embodiments is that the drawbacks of latency when transferring from a low power mode are mitigated.

Yet an advantage of some embodiments is that the mode changes are completely transparent to the wireless communication devices associated with the RU(s).

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where an alternative and improved approach to low power modes of a network node is provided. According to some embodiments, some functionality normally performed by a centralized unit (CU) is handed over to one or more remote units (RU) when the centralized unit is to enter a low power mode (e.g. sleep mode or power off mode). Furthermore, according to some embodiments, some functionality normally performed by a first centralized unit is handed over to another centralized unit when the first centralized unit is to enter a power off mode. Thus, existing functionality is differently partitioned between the centralized and remote units depending on the current mode of the centralized units. In other words, tasks are re-assigned between CU and RU when conditions allow and no introduction of special and/or parallel technology is required.

The centralized unit(s) and the remote unit(s) are physically separate units and association between a CU and a RU is achieved via a communication interface. The communication interface may be implemented using any suitable known or future physical and protocol approach, e.g. optical fiber, copper wire, Ethernet, communication bus, radio interface, etc.

The associated CU/RU may, or may not, be co-located at a same geographical site, at a same logical site, and/or comprised in a same network node. The name centralized unit and remote unit are to be understood as describing functional characteristics rather than physical characteristics. Thus, a centralized unit is typically a unit of a network node which is responsible for execution of non-distributed functions and a remote unit is typically a unit of a network node which is responsible for execution of distributed functions. Functionally, a remote unit is typically closer to the radio access interface than a centralized unit is.

Figure 1:
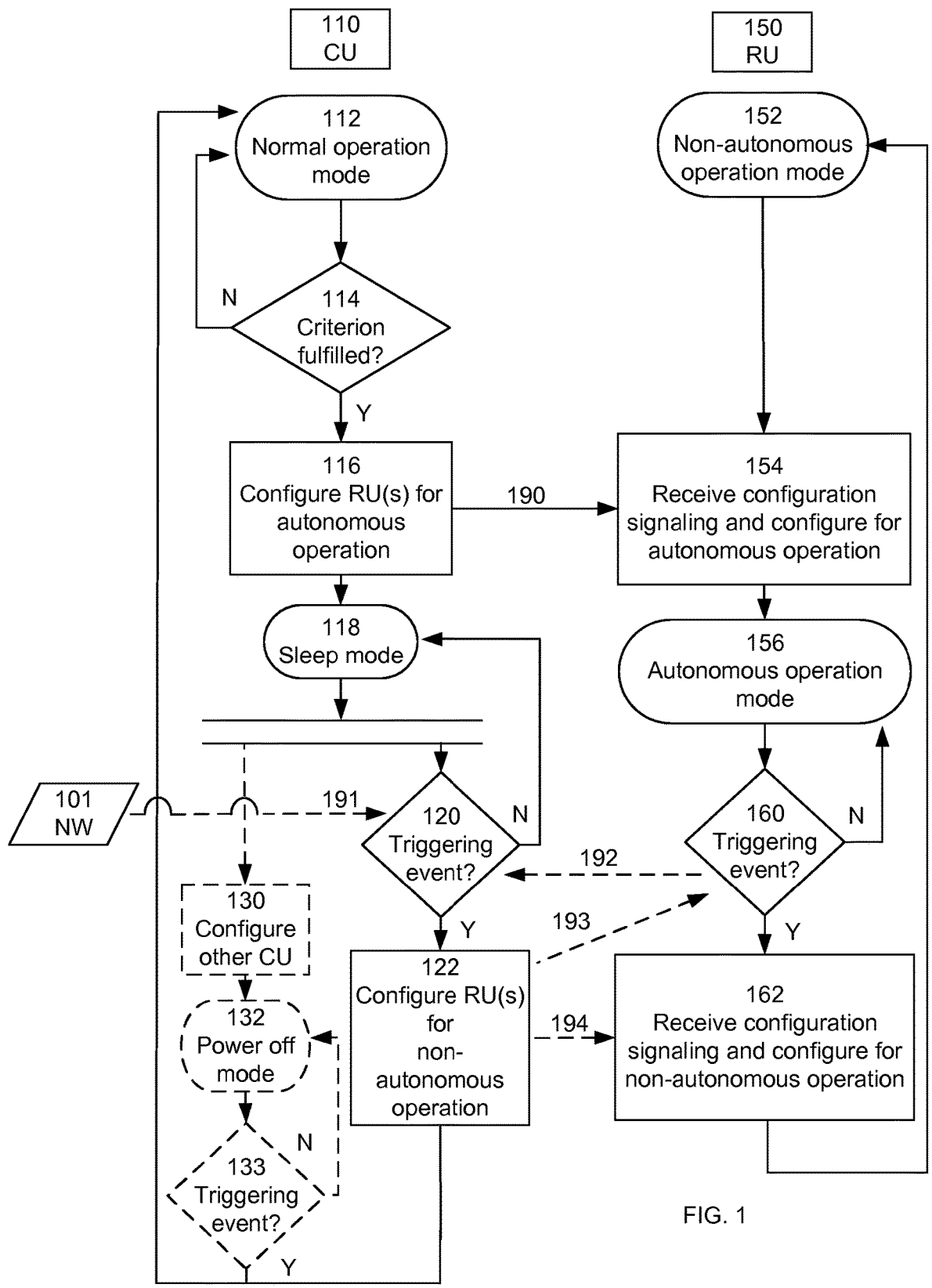
FIG. 1 is a combined flowchart and signaling diagram illustrating example method steps and signaling according to some embodiments.

FIG. 1 is a combined flowchart and signaling diagram illustrating example method steps and signaling between a centralized unit (CU) 110 and an associated remote unit (RU) 150 according to some embodiments.

The CU is adapted to operate in one of a plurality of modes including a normal operation mode 112 and one or more power saving operation modes (a sleep mode 118 and optionally a power off mode 132). The RU is also adapted to operate in one of a plurality of modes including at least a non-autonomous operation mode (152) associated with the normal operation mode of the CU and an autonomous operation mode (156) associated with the power saving operation mode of the CU.

When the CU is in the normal operation mode 112, there is a plurality of functions to be performed by the CU. Such functions may, for example, comprise one or more of: responding to random access requests by issuing of random access grants for transmission by the RU, responding to demands for system information by providing a system information block for transmission by the RU, providing synchronization signals for transmission by the RU, providing master information blocks for transmission by the RU, and providing system information blocks for transmission by the RU.

During CU normal operation mode 112, the RU is in non-autonomous operation mode 152 and the method comprises the CU determining whether a traffic load associated with one or more of the associated RU fulfills a power saving operation criterion as illustrated by step 114. For example, the power saving operation criterion may be fulfilled when none of the associated RU have a WCD in connected mode. If the power saving operation criterion is not fulfilled (N-path out from step 114), the CU remains in the normal operation mode 112.

The traffic load may be measured according to any suitable metric and it may be acquired using any suitable known or future method. For example, a registering unit may be configured to keep track of the wireless communication devices currently registered to a particular RU and their respective mode of operation (e.g. idle mode, connected mode, etc.). Then, it may determine that the traffic load associated with a RU fulfils the power saving operation criterion if that RU currently has no wireless communication devices in an active (e.g. connected) mode.

If the power saving operation criterion is fulfilled (Y-path out from step 114), the CU prepares for sleep mode 118 by configuring its associated RU(s) for autonomous operation as illustrated by step 116 and signaling 190. The autonomous operation mode configuration signaling 190 takes place via the respective communication interface of each RU and is received by the RU in step 154, wherein the RU correspondingly configures for autonomous operation. The configuration of the RU for autonomous operation comprises configuring the RU to execute at least one of the plurality of functions that are performed by the CU in normal operation mode.

The configuration of the RU may comprise configuring the RU to execute the function of responding to random access requests by issuing of random access grants for transmission by the RU. Then, the configuration of steps 116 and 154 may comprise the CU providing the RU with pre-generated random access grants.

In some embodiments a timing advance (TA) indication is to be included when the RU sends the random access grant. Such a TA can typically not be pre-generated since it depends on the physical distance between RU and wireless communication device. Thus, in autonomous mode, the RU is typically configured to calculate the TA for transmission with the random access grant.

The configuration of the RU may comprise configuring the RU to execute the function of responding to demands for system information by providing a system information block for transmission by the RU. Then, the configuration of steps 116 and 154 may comprise the CU providing the RU with pre-generated system information blocks.

The configuration of the RU may comprise configuring the RU to execute the function of providing synchronization signals for transmission by the RU. Then, the configuration of steps 116 and 154 may comprise the CU providing the RU with a timing reference. Alternatively or additionally, the RU may acquire and/or maintain a timing reference without signaling from the CU.

The configuration of the RU may comprise configuring the RU to execute the function of providing master information blocks for transmission by the RU. Then, the configuration of steps 116 and 154 may comprise the CU providing the RU with pre-generated master information blocks.

The configuration of the RU may comprise configuring the RU to execute the function of providing system information blocks for transmission by the RU. Then, the configuration of steps 116 and 154 may comprise the CU providing the RU with pre-generated system information blocks.

After configuration of the RU in steps 116 and 154, the RU transfers from non-autonomous operation mode to autonomous operation mode 156, and the CU transfers from normal operation mode to sleep mode 118. Typically, there may be some handshaking between the RU and the CU (or at least a configuration complete signal from the RU) before the CU transfers to sleep mode.

During CU sleep mode 118, the RU is in autonomous operation mode 156. The CU remains in low power operation mode and the RU remains in autonomous operation mode as long as no mode change triggering event is detected by either the RU or the CU as illustrated by the N-paths out from steps 120 and 160, respectively.

If a normal operation mode triggering event is detected by the CU (Y-path out from step 120), then the CU continues to step 122 where preparations for normal operation mode of the CU and non-autonomous operation mode for the RU(s) are performed.

A normal operation mode triggering event may, for example, comprise receiving an interrupt signal from one of the one or more RU as illustrated by signaling 192. Such an interrupt signal may, typically, be due to the RU detecting a non-autonomous operation mode triggering event in step 160 as will be elaborated on in the following. Alternatively or additionally, a normal operation mode triggering event may comprise receiving a triggering signal 191 (e.g. a paging signal) from the wireless communication network 101 for a wireless communication device associated with the RU. Such a triggering signal may, for example, be received via a transport network interface. Yet alternatively or additionally, a normal operation mode triggering event may comprise detecting that a predetermined duration for the power saving operation mode has elapsed.

If a non-autonomous operation mode triggering event is detected by the RU (Y-path out from step 160), then the RU may transmit an interrupt signal 192 to the CU to cause the CU to continue to step 122 where preparations for normal operation mode of the CU and non-autonomous operation mode for the RU(s) are performed.

A non-autonomous operation mode triggering event may, for example, comprise receiving a random access request from a wireless communication device associated with the RU. Typically, the RU may then transmit a pre-generated random access grant in connection with transmitting the interrupt signal 192 to the CU. The latency requirements before the CU is transferred to normal operation mode may be somewhat relaxed since the RU can send the random access grant before the CU is out of sleep mode. In some embodiments, the latency requirements before the CU is transferred to normal operation mode may be further somewhat relaxed if the pre-generated random access grant refers to a radio resource which is as late as possible under the standardization applicable.

Alternatively or additionally, a non-autonomous operation mode triggering event may comprise detecting that more pre-generated random access grants are required, that more pre-generated system information blocks are required, that more pre-generated master information blocks are required, and/or that a new timing reference is needed. Then the interrupt signal 192 may be transmitted to the CU in response thereto.

In some embodiments, a non-autonomous operation mode triggering event detected by the RU (Y-path out from step 160) is due to detection of a normal operation mode triggering event by the CU. Then, the CU may already have continued to step 122 and the non-autonomous operation mode triggering event may be part of signaling 193 by the CU in step 122. In these embodiments, the interrupt signaling 192 may, typically, be omitted. Examples of such non-autonomous operation mode triggering event include receiving a paging signal relayed from the CU and/or receiving non-autonomous operation mode configuration signaling from the CU.

Alternatively or additionally, a non-autonomous operation mode triggering event may comprise detecting that a predetermined duration for the power saving operation mode of the CU has elapsed. In these embodiments, there may or may not be a corresponding time keeping at the CU wherein a normal operation mode triggering event comprises detecting that a predetermined duration for the power saving operation mode has elapsed as mentioned above. If this type of detection is only at the CU the signaling 193 may be applicable, if this type of detection is only at the RU the signaling 192 may be applicable, and if this type of detection is at both the CU and the RU neither of the signaling 192, 193 may be applicable, according to various embodiments.

In any case, when a normal operation mode triggering event and/or a non-autonomous operation mode triggering event has been detected (Y-paths out from steps 120 and 160), the CU continues to step 122 and the RU continues to step 162.

In step 122 the CU prepares for normal operation mode 112 by configuring its associated RU(s) for non-autonomous operation as illustrated by signaling 194. The non-autonomous operation mode configuration signaling 194 takes place via the respective communication interface of each RU and is received by the RU in step 162, wherein the RU correspondingly configures for non-autonomous operation. The configuration of the RU for non-autonomous operation comprises configuring the RU to no longer execute the functions that are performed by the CU in normal operation mode as described above. Furthermore, the CU configures itself to perform those operations in preparation for CU normal operation mode. In some embodiments, e.g. when the RU triggers the CU to transfer to normal operation mode, the signaling 194 may be omitted.

After configuration of the RU in steps 122 and 162, the RU transfers from autonomous operation mode to non-autonomous operation mode 152, and the CU transfers from sleep mode to normal operation mode 112. Typically, there may be some handshaking between the RU and the CU (or at least a mode transfer complete signal from the CU) before the RU transfers to non-autonomous operation mode.

In some embodiments, the CU can enter a second power saving mode from the sleep mode 118; a power off mode 132. Such a power saving mode may be used, for example, when statistical data renders it unlikely that the traffic conditions tested in step 114 will change in the near future. In these embodiments, the (first) CU may configure another (second) CU to take over its functions before entering the power off mode as illustrated by step 130.

Thus, the first CU may configure the second CU to be able to wake up the first CU if necessary by configuring the second CU to control the respective communication interfaces of the one or more RU(s), detect a normal operation mode triggering event for the first CU (compare with step 120), configure each of the RU for non-autonomous operation in response thereto (compare with step 122) and cause the first CU to transfer from the power off mode to the normal operation mode as illustrated by step 133.

In some embodiments, the CU can enter the power off mode 132 directly from the normal operation mode 112. Then, the RU(s) of the first CU may or may not be configured for autonomous operation by the second CU.

Figure 2:
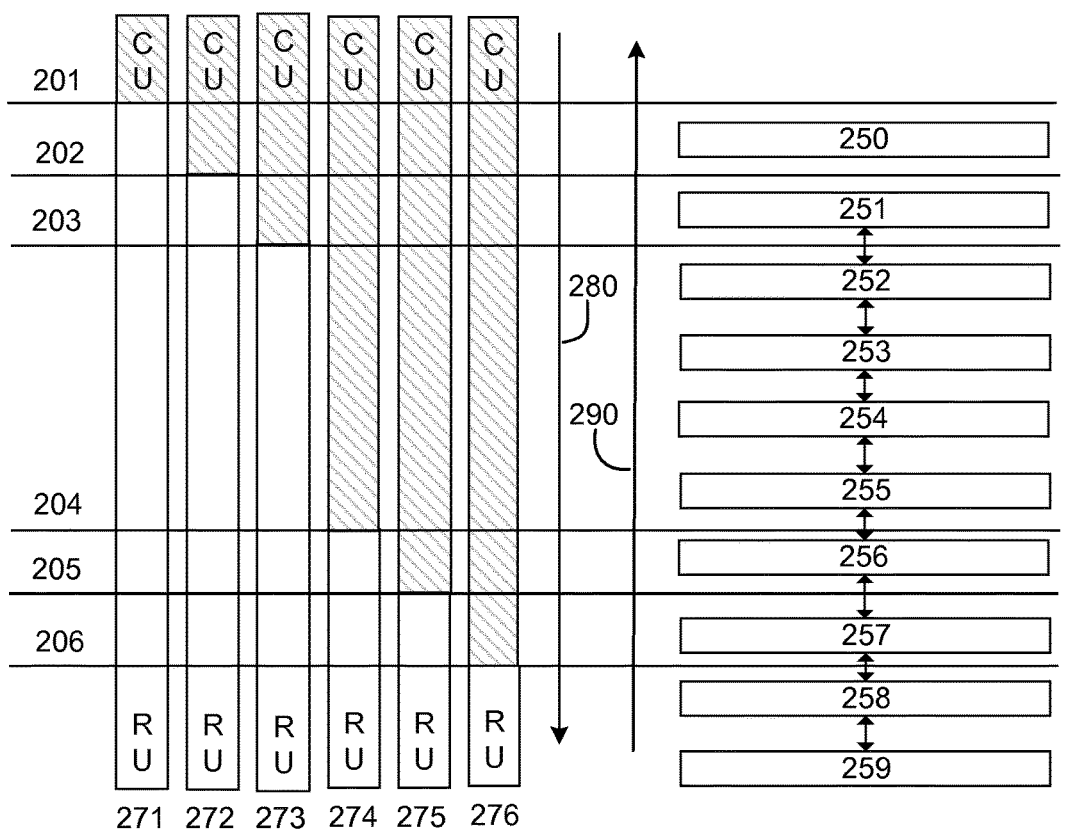
FIG. 2 is a schematic drawing illustrating example functional partitions according to some embodiments.

FIG. 2 is a schematic drawing illustrating example functional partitions according to some embodiments. The example of FIG. 2 may be applicable in 5G according to current or future standardization.

Different types of processing are depicted to the right of FIG. 2; packet data convergence protocol (PDCP) and radio resource control (RRC) 250, medium access control (MAC) and radio link control (RLC) 251, hybrid automatic repeat request (HARQ) 252, forward error correction coding and decoding (FEC) 253, modulation and demodulation (MOD) 254, precoding and equalization 255, resource mapping and demapping 256, antenna processing 257, radio frequency (RF) processing 258, and antenna interface 259. The arrow 280 denotes downlink processing flow and the arrow 290 denotes uplink processing flow.

The lowermost functions of FIG. 2 are close to the antenna and generally require, or benefits from, dedicated specialized hardware (sometimes referred to as Special Purpose Processor, SPP) for efficient processing. Going further up in the layered structure of FIG. 2, the need for specialized hardware reduces gradually and, at the uppermost functions of FIG. 2, generic general purpose hardware processing resources can be used (sometimes referred to as General Purpose Processor, GPP). Functions close to the antenna also generally require real time processing with short latency while functions of higher layers have more modest real time processing requirements.

To the left, different splits of functionality between CU and RU are indicated; common public radio interface (CPRI) split 206, split A 205, split B 204, split C 203, split D 202, and split E 201, and the functionality partitions between RU and CU are illustrated at 271-276. These different splits are example partitions that may be used in connection with the method of FIG. 1. For example, split E can be used for power off mode of the CU and split D can be used for sleep mode of the CU. It should be noted that these splits are merely examples and that other splits, more splits, or less splits may be applied as suitable.

Certain functions like carrier aggregation (CA) and Coordinated Multi Point (CoMP) requires central processing and coordination between multiple RU connecting to a common CU. This sets a minimum allocated functional split for the CU for such approaches (split C, B, A, or CPRI).

Thus, when considering splits between CU and RU functionality, it is noted that some functions can be processed on generic hardware and there may be advantages in relation to cost and/or sharing in having as many as possible of those functions in CU. It is also noted that some coordinated functions (e.g. CA) typically need to be deployed in CU when a CU is serving multiple RU(s). It is also noted that sharing a lot of functions in a CU (e.g. configuration 276) may entail strict requirements on the interface between CU and RU(s) in terms of latency and/or aggregated data rate.

Figure 3:
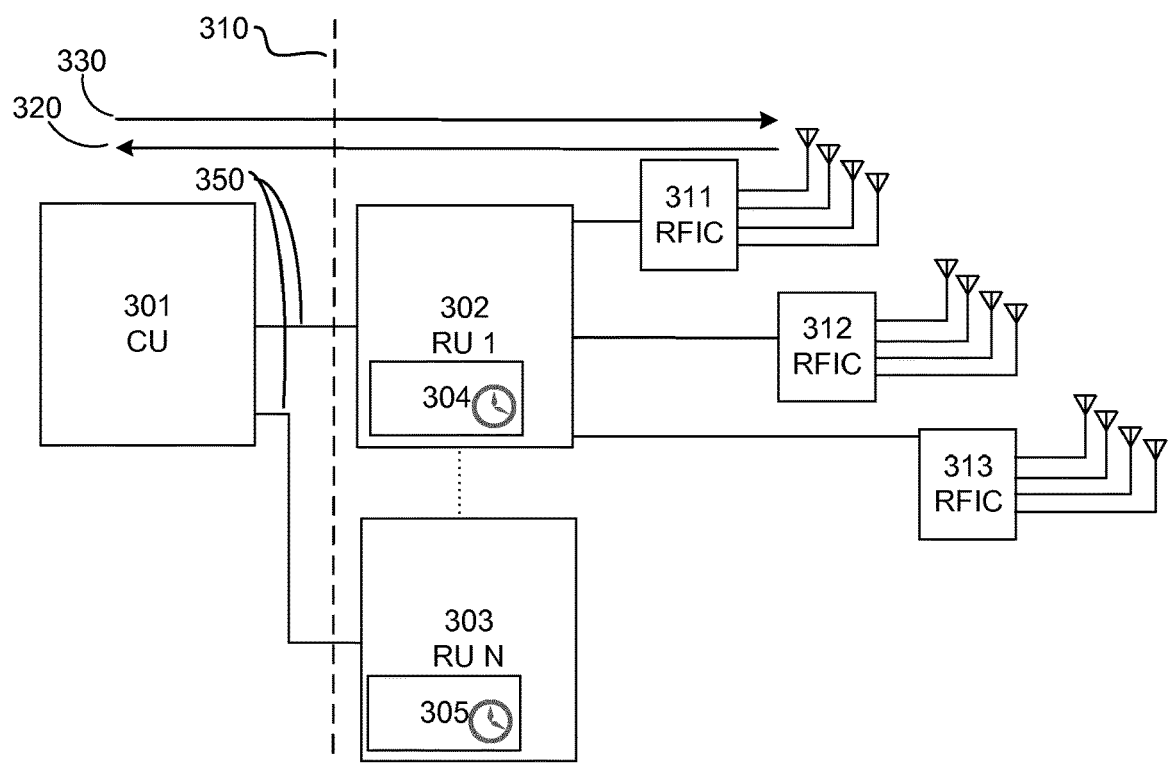
FIG. 3 is a schematic block diagram illustrating an example arrangement according to some embodiments.

FIG. 3 schematically illustrates an example arrangement according to some embodiments, where a CU 301 is associated with RU 1, 302, through RU N, 303, via connections 350. Each RU has a time keeping functionality 304, 305 and is associated with one or more radio front end (RFIC) 311, 312, 313.

In FIG. 3, the CU is in normal operation mode and the RU(s) are in non-autonomous mode. Hence, uplink processing 320 and downlink processing 330 take place in both CU and RU according to some suitable partition and signaling flows via the communication interface 310.

Figure 4:
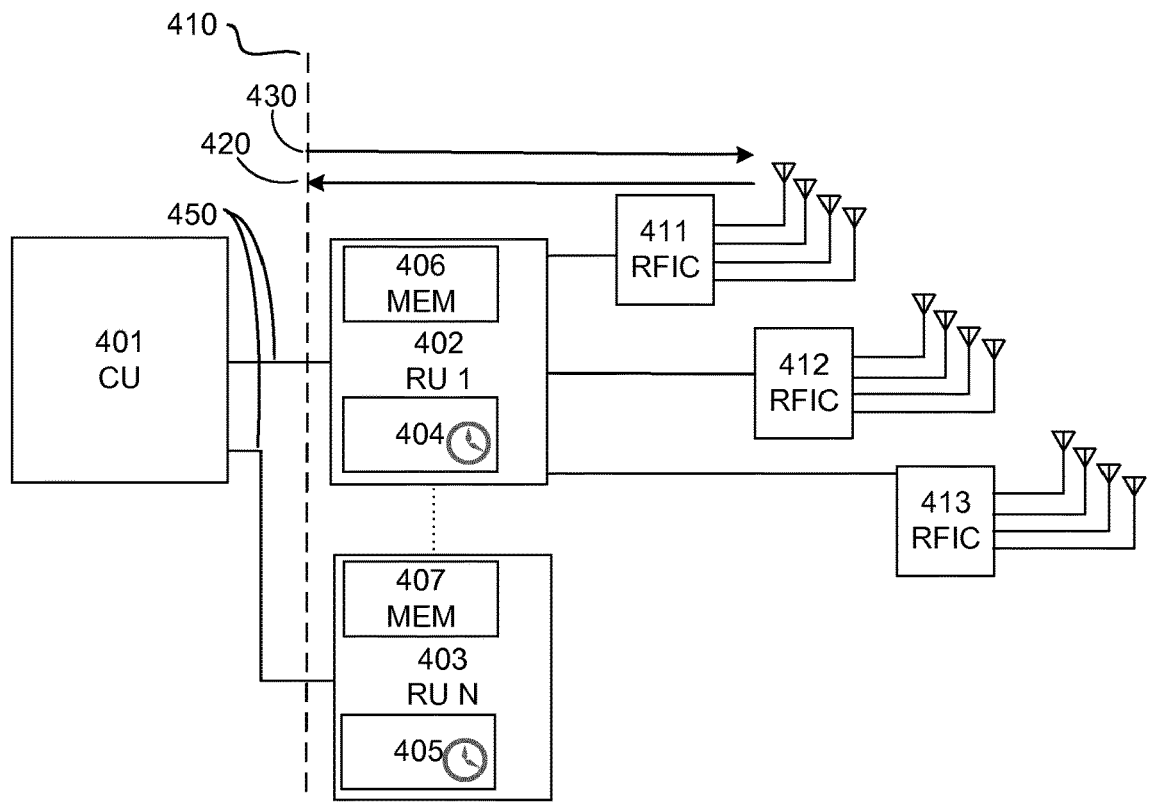
FIG. 4 is a schematic block diagram illustrating an example arrangement according to some embodiments.

FIG. 4 schematically illustrates an example arrangement according to some embodiments, where a CU 401 is associated with RU 1, 402, through RU N, 403, via connections 450. Each RU has a time keeping functionality 404, 405 and is associated with one or more radio front end (RFIC) 411, 412, 413.

In FIG. 4, the CU is in sleep mode and the RU(s) are in autonomous mode. Hence, uplink processing 420 and downlink processing 430 take place in RU and no (or extremely limited) signaling flows via the communication interface 410. To enable this, the RU(s) are equipped with storing circuitry (MEM) 406, 407 for storing one or more of pre-generated random access grants, system information blocks, and master information blocks. The time keeping functionalities 404, 405 may run based on a timing reference either provided by the CU in the normal operation mode or otherwise acquired.

For example, the RU(s) may be configured to handle periodic broadcast, periodic random access, periodic RIBS (Radio Interface Based Synchronization) processing and timing adjustment, and/or processing of other external synchronization data (such as global navigation satellite system—GNSS, precision time protocol—PTP, etc.).

Figure 5:
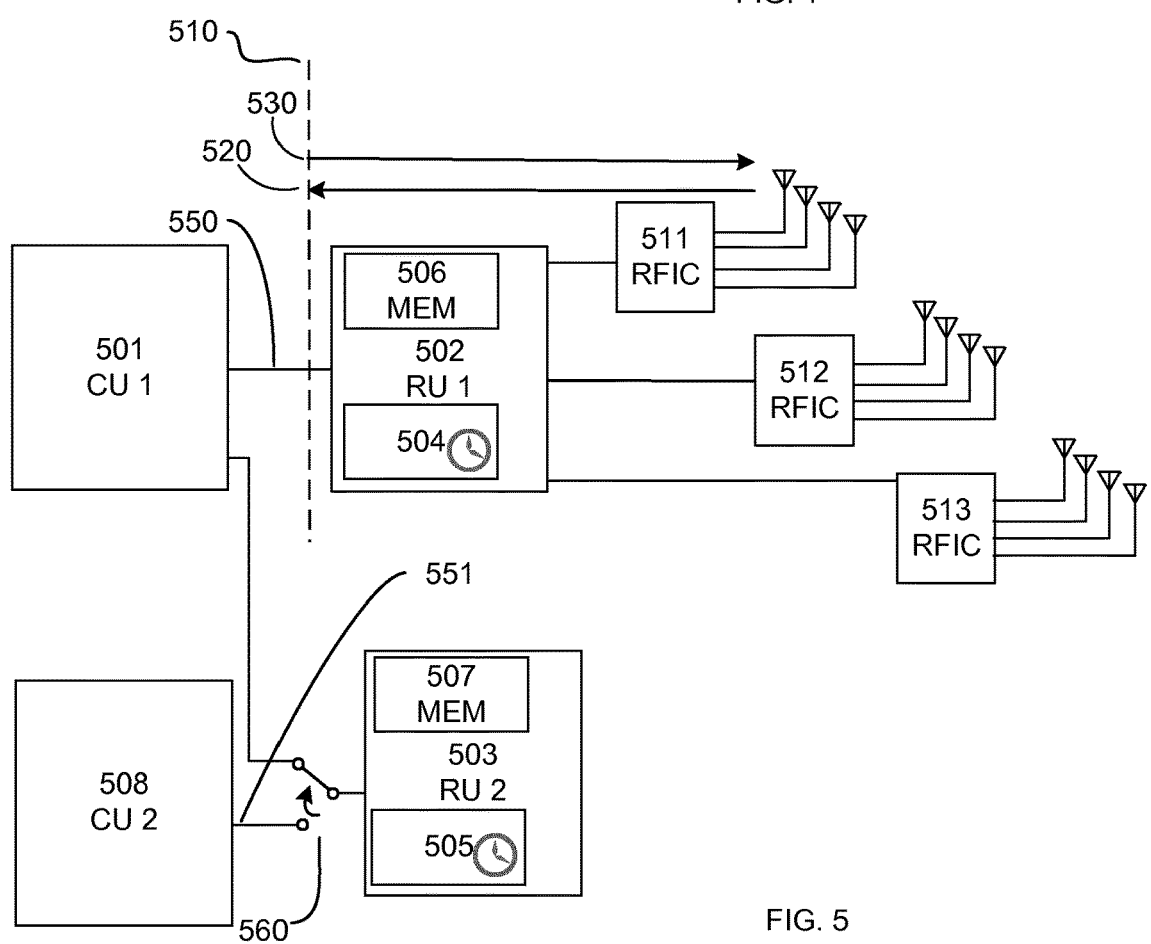
FIG. 5 is a schematic block diagram illustrating an example arrangement according to some embodiments.

FIG. 5 schematically illustrates an example arrangement according to some embodiments, where a CU 1, 501, is associated with RU 1, 502, via connection 550, and a CU 2 508 is associated with RU 2, 503, via connection 551. Each RU has a time keeping functionality 504, 505 and storing circuitry (MEM) 506, 507, and is associated with one or more radio front end (RFIC) 511, 512, 513.

In FIG. 5, the CU 1 is in sleep mode and RU 1 is in autonomous mode. Hence, uplink processing 520 and downlink processing 530 take place in RU 1 and no (or extremely limited) signaling flows via the communication interface 510. RU 2 is also in autonomous mode. However, CU 2 is in a power off mode and has configured CU 1 to temporarily control the communication with RU 2, the transfer of responsibility from CU 2 to CU 1 being schematically illustrated by switch 560.

Figure 6:
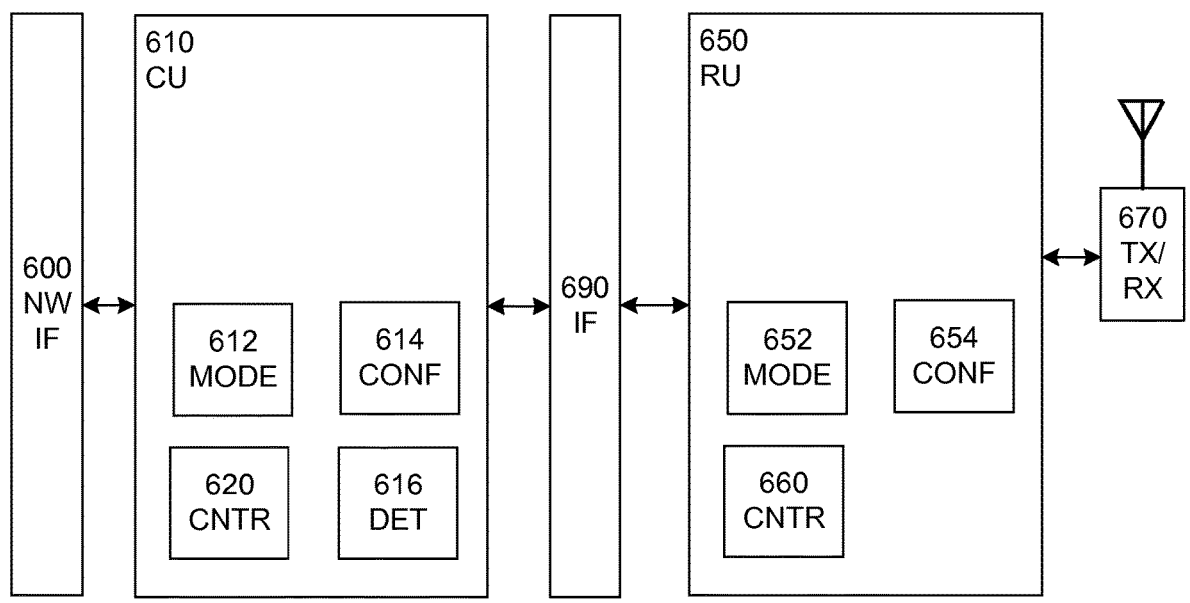
FIG. 6 is a schematic block diagram illustrating an example arrangement according to some embodiments.

FIG. 6 schematically illustrates an example arrangement for a network node according to some embodiments. The example arrangement may, for example, be configured to cause performance of method steps as described above in connection to FIG. 1.

The arrangement comprises a CU 610 and a RU 650 associated via a communication interface (IF) 690. The CU is associated with the rest of a wireless communication network via network interface (NW IF) 600 and the RU is associated with a wireless transceiver (TX/RX) 670 for provision of a radio access interface. In various embodiments, the transceiver 670 may or may not be comprised in the RU 650.

The CU is adapted to operate in one of a plurality of modes including a normal operation mode—defining a plurality of functions to be performed by the CU in normal operation mode—and a power saving operation mode (e.g. sleep mode and/or power off mode).

The CU comprises a controller (CNTR) 620 configured to cause (when the CU is in the normal operation mode) determination of that a traffic load associated with the one or more RU fulfills a power saving operation criterion, configuration—via the communication interface 690—of the RU for autonomous operation (whereby each of the RU is configured to execute at least one of the plurality of functions) and transfer from the normal operation mode to the power saving operation mode.

The determination may, for example, be performed by determination circuitry (e.g. a determiner, DET) 616 which may be comprised in, or otherwise associated with, the CU. The configuration may, for example, be performed by configuring circuitry (e.g. a configurer, CONF) 614 which may be comprised in, or otherwise associated with, the CU. The mode transfer may, for example, be performed by mode control circuitry (e.g. a mode controller, MODE) 612 which may be comprised in, or otherwise associated with, the CU.

The RU is adapted to operate in one of a plurality of modes including a non-autonomous mode (corresponding to the normal operation mode of the CU) and an autonomous mode (corresponding to the power saving operation mode of the CU).

The RU comprises a controller (CNTR) 660 configured to cause (when the RU is in the non-autonomous mode) reception—via the respective communication interface 690—of autonomous operation mode configuration signaling from the CU, configuration of the RU to execute at least one of to plurality of functions performed by the CU in normal operation mode, and transfer from the non-autonomous operation mode to the autonomous operation mode.

The configuration may, for example, be performed by configuring circuitry (e.g. a configurer, CONF) 654 which may be comprised in, or otherwise associated with, the RU. The mode transfer may, for example, be performed by mode control circuitry (e.g. a mode controller, MODE) 652 which may be comprised in, or otherwise associated with, the RU.

The controllers 620, 660 may also be configured to cause performance of other steps explained above in connection with FIG. 1. For example, the controller 620 may be configured to cause (when the CU is in the power saving operation mode) detection of a normal operation mode triggering event, transfer from the power saving operation mode to the normal operation mode, and configuration of each of the RU for non-autonomous operation, and the controller 660 may be configured to cause (when the RU is in the autonomous operation mode) detection of a non-autonomous operation mode triggering event, and transfer from the autonomous operation mode to the non-autonomous operation mode, whereby the RU is not configured to execute any of the plurality of functions.

Thus, according to various embodiments, an approach to power efficient base stations is provided while continuous service enabled. When there is no traffic there is typically very limited transmission/reception (e.g. in a 5G lean signaling architecture) and the remaining activities are typically periodic, known in content and time (or could at least be predicted). When not serving any traffic, the processing load in the system will thus typically be small. Using available resources in the RU to locally address such transmissions/receptions would allow longer and deeper sleep modes for CU normally involved in processing for such functions. This is especially prominent if such functions serve many radio units (e.g. as in C-RAN architectures). This approach also allows efficient sleep mode for high speed interfaces between RU and CU, providing additional power savings—especially prominent when CU/RU(s) are distributed.

Taking 5G as an example, the remaining mandatory parts when no traffic is served may comprise:

Transmit broadcast signals:
Synchronization signal (SS, may be denoted NR-PSS and NR-SSS in case the new radio (NR) SS is divided into a primary (P) and a secondary (S) part).
A master information block (MIB, or NR-MIB) transmitted in a first physical broadcast channel (may be denoted new radio first physical broadcast channel, NR-PBCH1).
System information block (SIB or NR-SIB). The SIB in NR may be transmitted in a second physical broadcast channel (NR-PBCH2) or scheduled by the NR physical downlink control channel (NR-PDCCH) and carried by the NR physical downlink shared channel (NR-PDSCH).
The timing and content of these NR idle mode broadcast signals and channels are expected to be known (or predictable) by the base station.

Listening for UE random access requests and system information-on-demand requests:
The timing and data is known and during low traffic scenarios the likelihood of any UE requesting access is relatively low.

Receive and transmit radio interface based synchronization (RIBS in 3GPP terminology):
The timing and data is known. During low traffic scenarios there is less temperature dynamic which entails less drift of internal oscillators and thereby reduced RIBS frequency.

To reduce the overall power consumption, some embodiments suggest to also let the RU take care of regular, periodic, known (or predictable) transmissions and receptions normally handled by CU, Thereby, longer (and deeper) periods of sleep mode of CU and interfaces are enabled.

A key feature of NR is multi user multiple input multiple output (MU-MIMO). A radio unit supporting spatial separation of users requires an antenna system with a large amount of individually controllable antenna elements. The distribution of user data over the different antenna elements is preferably done in the RU requiring significant digital signal processing power available in the RU. In cases with low traffic load, there is therefore typically a lot of processing power available in the RU.

Embodiments include changing the broadcasted system information to limit the number of possible random-access pre-ambles and thereby reduce the required processing in the RU. Such changes may include, but is not limited to:

Stop sending PRACH (Physical Random Access Channel) configurations in the broadcasted system information and instead indicate that this information is available on-demand.

Increasing the time between PRACH occasion windows.

Embodiments include preparing PRACH response messages (or parts of such messages) in advance and storing them locally in the RU and thereby enabling the base band longer time to re-activate before it needs to be fully operational. For example:

For system information (SI) on demand, request the requested SI is pre-calculated and transmitted from the RU upon request.

Embodiments include pre-calculating the random access response (RAR) messages for normal PRACH operation. The UE may thereby receive the first uplink grant directly from the RU.

Embodiments also include approaches for the RU to autonomously handle transmission of periodic broadcast information by:

Periodically updating predictable dynamic information in the periodic broadcast transmission by itself (e.g. timing information), or Using pre-calculated values pre-stored in memories which may, for example, be updated on demand or with low frequency.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a central unit, a remote unit, or a network node.

Embodiments may appear within an electronic apparatus (such as a central unit, a remote unit, or a network node) comprising arrangements, circuitry, and/or logic according to any of the embodiments described herein. Alternatively or additionally, an electronic apparatus (such as a central unit, a remote unit, or a network node) may be configured to perform methods according to any of the embodiments described herein.

Figure 7:
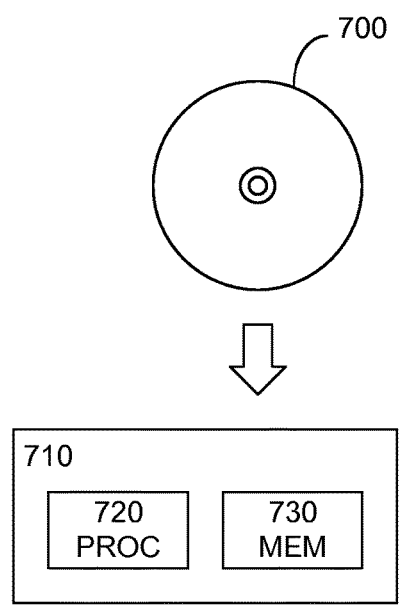
FIG. 7 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 7 illustrates an example computer readable medium in the form of a compact disc (CD) ROM 700. The computer readable medium has stored thereon a computer program comprising program instructions. The computer program is loadable into a data processor (PROC) 720, which may, for example, be comprised in a central unit, a remote unit, or a network node 710. When loaded into the data processing unit, the computer program may be stored in a memory (MEM) 730 associated with or comprised in the data-processing unit. According to some embodiments, the computer program may, when loaded into and run by the data processing unit, cause execution of method steps according to, for example, any of the methods illustrated in FIG. 1 or otherwise described herein.

Reference has been made herein to various embodiments. However, a person skilled in the art would recognize numerous variations to the described embodiments that would still fall within the scope of the claims. For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Hence, it should be understood that the details of the described embodiments are merely examples brought forward for illustrative purposes, and that all variations that fall within the scope of the claims are intended to be embraced therein.

The invention claimed is:

1. A method for a centralized unit (CU), of a wireless communication network, that is associated with one or more remote units (RUs) of the wireless communication network, the method comprising:

performing the following operations when the CU is in a normal operation mode that defines a plurality of base station functions to be performed by the CU:

determining that a traffic load of the one or more RUs fulfills a power saving operation criterion, wherein the traffic load is related to wireless communication devices associated with the one or more RUs;

configuring the one or more RUs, via respective communication interfaces, for an autonomous operation mode in which the respective RUs are configured to execute at least one of the plurality of base station functions defined for the CU in the normal operation mode; and transferring the CU from the normal operation mode to a power saving operation mode.

2. The method of claim 1 wherein the at least one of the plurality of base station functions comprises one or more of the following:

responding to a random access request from a wireless communication device by issuing of a random access grant for transmission;

responding to wireless communication device demands for system information by providing a system information block for transmission;

providing synchronization signals for transmission;

providing master information blocks for transmission; and providing system information blocks for transmission.

3. The method of claim 1, wherein the power saving operation criterion comprises that none of the RUs is associated with a wireless communication device operating in a connected mode.

4. The method of claim 1, wherein configuring the one or more RUs for autonomous operation comprises providing the respective RUs with at least one of the following:

pre-generated random access grants;

pre-generated system information blocks;

a timing reference; and pre-generated master information blocks.

5. The method of claim 1, wherein:
the power saving operation mode is a sleep mode; and
the method further comprises performing the following operations when the CU is in the power saving operation mode:
  detecting a normal operation mode triggering event;
  configuring the RUs, via the respective communication interfaces, for non-autonomous operation; and
  transferring from the power saving operation mode to the normal operation mode.

6. The method of claim 5, wherein detecting the normal operation mode triggering event comprises at least one of the following:
  receiving an interrupt signal from one of the RUs;
  receiving a paging signal from the wireless communication network; and
  detecting that a predetermined duration for the power saving operation mode has elapsed.

7. The method of claim 1, wherein:
the power saving operation mode is a power off mode; and the CU is a first CU; and
the method further comprises configuring a second CU to perform the following operations when the first CU is in the power off mode:
  control the respective communication interfaces to RUs;
  detect a normal operation mode triggering event for the first CU;
  configure the RUs, via the respective communication interfaces, for non-autonomous operation; and
  cause the first CU to transfer from the power off mode to the normal operation mode.

8. A method for a remote unit (RU), of a wireless communication network, that is associated with a centralized unit (CU) of the wireless communication network, the method comprising,
  performing the following operations when the RU is in a non-autonomous operation mode that is associated with a normal operation mode of the CU:
    receiving autonomous operation mode configuration signaling from the CU via a communication interface;
    configuring the RU to execute at least one of a plurality of base station functions defined to be performed by the CU in the normal operation mode; and
    transferring the RU from the non-autonomous operation mode to an autonomous operation mode, of the RU, that is associated with a power saving operation mode of the CU.

9. The method of claim 8, wherein the at least one of the plurality of base station functions comprises at least one of the following:
  responding to a random access request from a wireless communication device by issuing of a random access grant for transmission;
  responding to wireless communication device demands for system information by providing a system information block for transmission;
  providing synchronization signals for transmission;
  providing master information blocks for transmission; and
  providing system information blocks for transmission.

10. The method of claim 8, wherein the configuration signaling comprises at least one of:
  pre-generated random access grants;
  pre-generated system information blocks;
  a timing reference; and
  pre-generated master information blocks.

11. The method of claim 8, further comprising performing the following operations when the RU is in the autonomous operation mode:
  detecting a non-autonomous operation mode triggering event; and
  transferring from the autonomous operation mode to the non-autonomous operation mode, whereby the RU is not configured to execute any of the plurality of base station functions.

12. The method of claim 11, wherein:
detecting the non-autonomous operation mode triggering event comprises at least one of the following:
  receiving a random access request from a wireless communication device associated with the RU,
  detecting that more pre-generated random access grants are required,
  detecting that more pre-generated system information blocks are required,
  detecting that more pre-generated master information blocks are required, and
  detecting that a new timing reference is needed; and
the method further comprises transmitting an interrupt signal to the CU for triggering normal operation mode of the CU.

13. The method of claim 11, wherein detecting the non-autonomous operation mode triggering event comprises at least one of the following:
  receiving a paging signal from the CU;
  receiving, via the communication interface, non-autonomous operation mode configuration signaling from the CU; and
  detecting that a predetermined duration for the autonomous operation mode has elapsed.

14. A non-transitory computer readable medium storing executable program instructions that, when executed by a data processing circuit of centralized unit (CU) of a wireless communication network, configures the CU to perform operations corresponding to the method of claim 1.

15. A centralized unit (CU), of a wireless communication network, that is associated with one or more remote units (RUs) of the wireless communication network, the CU comprising:
  one or more communication interfaces configured to communicate with the respective one or more RUs; and
  a controller operatively coupled to the communication interfaces, whereby the controller and the communication interfaces are configured to perform the following operations when the CU is in a normal operation mode that defines a plurality of base station functions to be performed by the CU:
    determine that a traffic load of the one or more RUs fulfills a power saving operation criterion, wherein the traffic load is related to wireless communication devices associated with the one or more RUs;
    configure the one or more RUs, via respective communication interfaces, for an autonomous operation mode in which the respective RUs are configured to execute at least one of the plurality of base station functions defined for the CU in the normal operation mode; and
    transfer the CU from the normal operation mode to a power saving operation mode.

16. The CU of claim 15, wherein:
the power saving operation mode is a sleep mode; and
the controller and the communication interfaces are configured to perform the following operations when the CU is in the power saving operation mode:
  detect a normal operation mode triggering event;
  configure the RUs, via the respective communication interfaces, for non-autonomous operation; and
  transfer from the power saving operation mode to the normal operation mode.

17. The CU of claim 15, wherein:
the power saving operation mode is a power off mode;
the CU is a first CU; and
the controller and the communication interfaces are further configured to configure a second CU to perform the following operations when the first CU is in the power off mode:
  detect a normal operation mode triggering event for the first CU;
  configure the RUs, via the respective communication interfaces, for non-autonomous operation; and
  cause the first CU to transfer from the power off mode to the normal operation mode.

18. A remote unit (RU), of a wireless communication network, that is associated with a centralized unit (CU) of the wireless communication network, the RU comprising:
  a communication interface configured to communicate with the CU; and
  a controller operatively coupled to the communication interface, whereby the controller and the communication interface are configured to perform the following operations when the RU is in a non-autonomous operation mode that is associated with a normal operation mode of the CU:
    receive autonomous operation mode configuration signaling from the CU via the communication interface;
    configure the RU to execute at least one of a plurality of base station functions defined to be performed by the CU in the normal operation mode; and
    transfer the RU from the non-autonomous operation mode to an autonomous operation mode, of the RU, that is associated with a power saving operation mode of the CU.

19. The RU of claim 18, wherein the controller and the communication interface are further configured to perform the following operations when the RU is in the autonomous operation mode:
  detect a non-autonomous operation mode triggering event; and
  transfer from the autonomous operation mode to the non-autonomous operation mode, in which the RU is not configured to execute any of the plurality of base station functions.

20. The RU of claim 18, wherein:
the at least one of the plurality of base station functions comprises at least one of the following:
  responding to a random access request from a wireless communication device by issuing of a random access grant for transmission,
  responding to wireless communication device demands for system information by providing a system information block for transmission,
  providing synchronization signals for transmission,
  providing master information blocks for transmission, and
  providing system information blocks for transmission; and
the configuration signaling comprises at least one of the following:
  pre-generated random access grants,
  pre-generated system information blocks,
  a timing reference, and
  pre-generated master information blocks.

\* \* \* \* \*